(12) United States Patent
Yoshida et al.

(10) Patent No.: US 8,277,993 B2
(45) Date of Patent: Oct. 2, 2012

(54) FUEL CELL SYSTEM

(75) Inventors: Michio Yoshida, Nishikamo-gun (JP); Kenji Umayahara, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 179 days.

(21) Appl. No.: 12/740,605

(22) PCT Filed: Sep. 4, 2008

(86) PCT No.: PCT/JP2008/065997
§ 371 (c)(1),
(2), (4) Date: Apr. 29, 2010

(87) PCT Pub. No.: WO2009/057384
PCT Pub. Date: May 7, 2009

(65) Prior Publication Data
US 2010/0261084 A1  Oct. 14, 2010

(30) Foreign Application Priority Data
Oct. 31, 2007 (JP) ................................ 2007-283199

(51) Int. Cl.
*H01M 8/04* (2006.01)
*H01M 8/06* (2006.01)
(52) U.S. Cl. ......... 429/432; 429/427; 429/428; 429/443
(58) Field of Classification Search ........................ None
See application file for complete search history.

(56) References Cited

U.S. PATENT DOCUMENTS
2009/0226769 A1 * 9/2009 Ota .................................. 429/13

FOREIGN PATENT DOCUMENTS
| JP | 2005-302304 A | 10/2005 |
| JP | 2006-100005 A | 4/2006 |
| JP | 2006-331918 A | 12/2006 |
| JP | 2006-333602 A | 12/2006 |
| JP | 2007-109569 A | 4/2007 |
| JP | 2008-052937 A | 3/2008 |
| JP | 2008-218398 A | 9/2008 |
| WO | WO 2006126732 A1 * | 11/2006 |

* cited by examiner

*Primary Examiner* — Barbara Gilliam
*Assistant Examiner* — Adam A Arciero
(74) *Attorney, Agent, or Firm* — Kenyon & Kenyon LLP

(57) ABSTRACT

A fuel cell system is provided which can accurately detect an insulation resistance even during a high-potential prevention control. The fuel cell system includes: a fuel cell that generates electric power through an electrochemical reaction between a fuel gas and an oxidant gas; an insulation resistance measurement unit that measures an insulation resistance between the fuel cell and an outer conductor; and a control unit that controls a power generation state of the fuel cell, and the control unit carries out a high-potential prevention control that avoids a voltage of the fuel cell becoming equal to or higher than a predetermined high-potential prevention voltage threshold lower than an open circuit voltage of the fuel cell, and changes the high-potential prevention voltage threshold during an insulation resistance detection performed by the insulation resistance measurement unit.

3 Claims, 3 Drawing Sheets

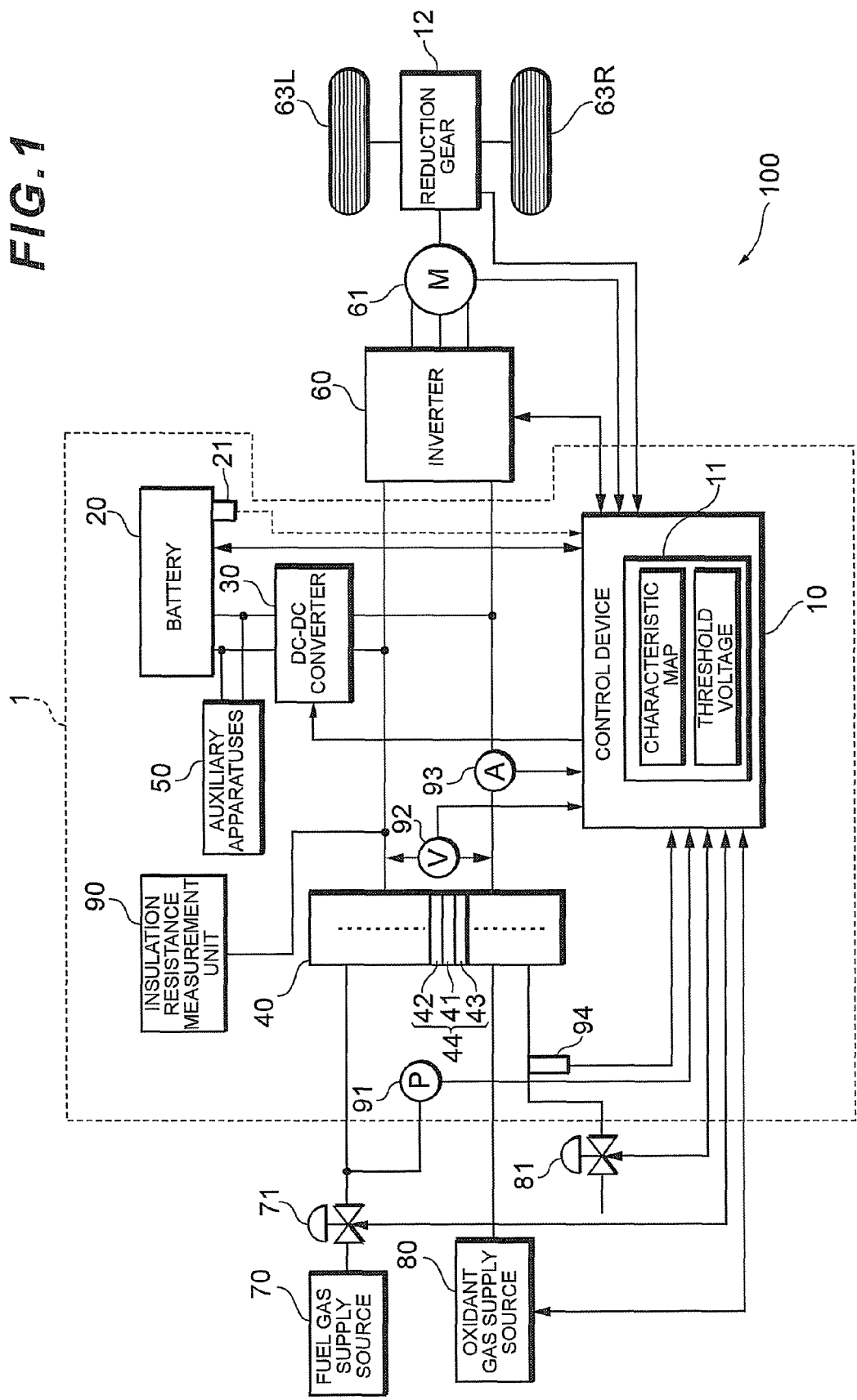

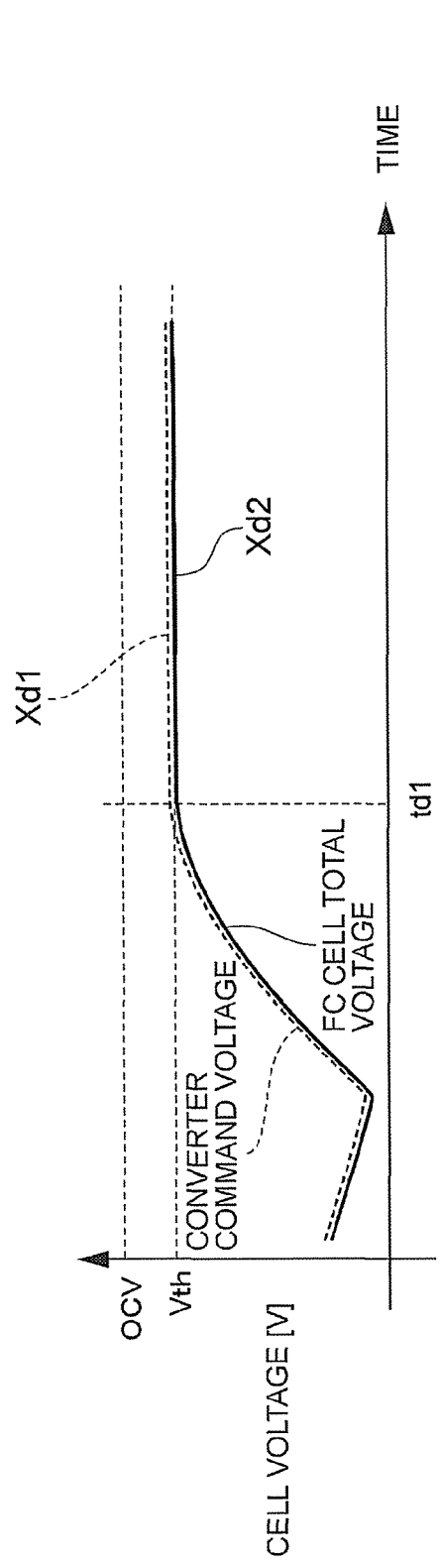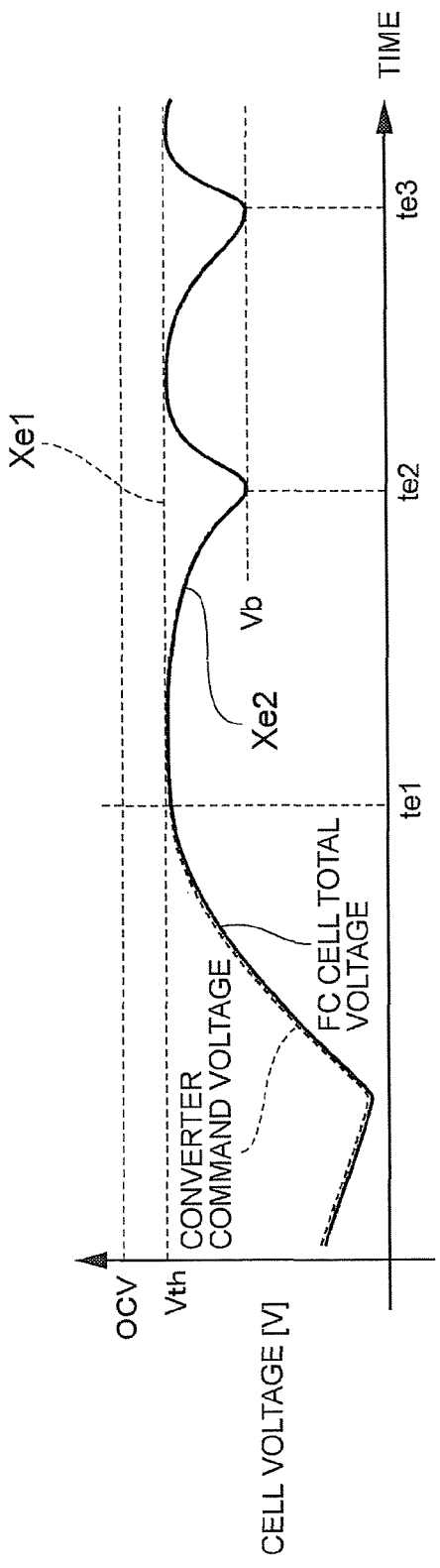

FUEL CELL SYSTEM

This is a 371 national phase application of PCT/JP2008/065997 filed 4 Sep. 2008, which claims priority to Japanese Patent Application No. 2007-283199 filed 31 Oct. 2007, the contents of which are incorporated herein by reference.

TECHNICAL FIELD

The present invention relates to a fuel cell system, and particularly relates to a technique for measuring the insulation resistance of a fuel cell.

BACKGROUND ART

In recent years, fuel cell systems which employ, as an energy source, a fuel cell that generates electric power through an electrochemical reaction between a fuel gas and an oxidant gas have been attracting attention. In the fuel cell systems, while a high-pressure fuel gas is supplied from a fuel tank to an anode of a fuel cell, air serving as an oxidant gas is supplied via pressurization to a cathode thereof, and an electrochemical reaction is made to occur between the fuel gas and the oxidant gas, thereby generating an electromotive force.

Such fuel cell systems include a fuel cell system which carries out, in order to avoid the advancement of deterioration of a fuel cell, a high-potential prevention control that avoids a voltage of the fuel cell becoming equal to or higher than a predetermined high-potential prevention voltage threshold according to a predetermined condition (see, e.g., Patent Document 1).

Patent Document 1: Japanese laid-open patent publication 2007-109569 A

DISCLOSURE OF THE INVENTION

Problem to be Solved by the Invention

In a water-cooled fuel cell system for cooling a fuel cell with a circular coolant, the conductivity of the coolant rises over time because of ions that dissolve in the coolant, and when the conductivity of the coolant becomes high, a current generated in the fuel cell, flows through the coolant, which might make it impossible for the generated power to be taken out effectively. Also, when the current flowing through the coolant is subjected to electrolysis, bubbles are generated in a coolant flow path, and the generated bubbles interrupt heat transfer from a cell to the coolant, which might cause insufficient cooling of the fuel cell.

In light of such circumstances, in order to avoid the occurrence of various malfunctions caused by a rise in the conductivity of the coolant, the rise in the conductivity of the coolant has been detected as an insulation resistance of the fuel cell, and an exchange of an ion removal filter for removing ions in the coolant, the coolant, etc., has been performed as necessary.

However, during the above-described high-potential prevention control that avoids an output voltage of a fuel cell becoming equal to or higher than a high-potential prevention voltage threshold, the output voltage of the fuel cell is not stable, and thus, a case has occurred where an insulation resistance cannot be detected accurately when an insulation resistance detection is attempted to be performed during the high-potential prevention control.

An object of the present invention is to provide a fuel cell system in which an insulation resistance can be detected accurately even during a high-potential prevention control.

Means for Solving the Problems

The present invention provides a fuel cell system including: a fuel cell that generates electric power through an electrochemical reaction between a fuel gas and an oxidant gas; an insulation resistance measurement unit that measures an insulation resistance between the fuel cell and an outer conductor; and a control unit that controls a power generation state of the fuel cell, in which the control unit carries out a high-potential prevention control that avoids a voltage of the fuel cell becoming equal to or higher than a predetermined high-potential prevention voltage threshold lower than an open circuit voltage of the fuel cell, and changes the high-potential prevention voltage threshold during an insulation resistance detection performed by the insulation resistance measurement unit.

With such a configuration, the high-potential prevention voltage threshold is changed, thereby adjusting the relationship between the time when a high-potential prevention control is carried out and the time when an insulation resistance is measured. This enables the insulation resistance to be detected accurately.

In this case, the control unit may perform an oxidant-gas blowing operation for maintaining the voltage of the fuel cell (hereinafter referred to as "voltage maintenance oxidant-gas blowing operation") in which an oxidant gas is supplied to the fuel cell when the voltage of the fuel cell decreases to a predetermined lower-limit voltage threshold lower than the high-potential prevention voltage threshold during the high-potential prevention control, and may change the high-potential prevention voltage threshold such that an interval between voltage maintenance oxidant-gas blowing operations is longer than an insulation resistance detectable time during the insulation resistance detection.

Also, the control unit may change the high-potential prevention voltage threshold in consideration of a variation, due to a cross leakage in the fuel cell, in the interval between voltage maintenance oxidant-gas blowing operations.

Effect of the Invention

According to the fuel cell system of the invention, an insulation resistance can be detected accurately even during a high-potential prevention control.

BRIEF DESCRIPTION OF THE DRAWINGS

FIG. 1 is a system configuration diagram schematically illustrating a fuel cell system according to an embodiment of the invention.

FIG. 2 is a time chart explaining a high-potential prevention control in a normal power generation mode of the fuel cell system.

FIG. 3 is a time chart explaining a high-potential prevention control in an output stop mode of the fuel cell system.

BEST MODE FOR CARRYING OUT THE INVENTION

Figure 4:
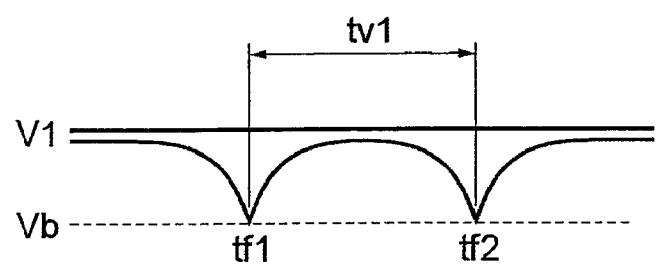
FIG. 4 is a time chart explaining the time when an insulation resistance detection is performed during a high-potential prevention control of the fuel cell system.

Now, an embodiment according to the present invention will be described with reference to the attached drawings.

FIG. 1 is a diagram showing a primary configuration in a fuel cell system 100 according to an embodiment. This embodiment assumes fuel cell systems mounted on vehicles such as fuel cell hybrid vehicles (FCHV), electric vehicles and hybrid vehicles, but the fuel cell systems may be applied not only to the vehicles but also to various mobile objects (e.g., two-wheel vehicles, ships, airplanes and robots). Furthermore, not only the fuel cell systems mounted on mobile objects but also stationary fuel cell systems and portable fuel cell systems may be employed.

The above vehicle drives with a traction motor 61, serving as a driving force source, which is connected to wheels 63L and 63R through a reduction gear 12. A power supply of the traction motor 61 is a power supply system 1. A direct current output from the power supply system 1 is converted into a three-phase alternating current by an inverter 60, and is supplied to the traction motor 61. The traction motor 61 can function also as a power generator during braking. The power supply system 1 is constituted by a fuel cell 40, a battery (power storage unit) 20, a DC/DC converter (converter) 30, etc.

The fuel cell 40 is a means for generating electric power from supplied reaction gases (fuel gas and oxidant gas), and various types of fuel cells such as polymer electrolyte fuel cells, phosphoric acid fuel cells and molten carbonate fuel cells may be used. The fuel cell 40 includes a polymer electrolyte membrane 41 constituted by, e.g., a proton conducting ion-exchange membrane made of, e.g., fluororesin, and a platinum catalyst (electrode catalyst) is applied onto a surface of the polymer electrolyte membrane.

The catalyst applied onto the polymer electrolyte membrane 41 is not limited to the platinum catalyst, and a platinum-cobalt catalyst (hereinafter simply referred to as catalyst), etc., may also be employed. Each of the cells constituting the fuel cell 40 includes a membrane electrode assembly 44 in which an anode 42 and a cathode 43 are formed through, e.g., screen printing, on both the surfaces of the polymer electrolyte membrane 41. The fuel cell 40 has a stack structure in which a plurality of unit cells is stacked in series.

An output voltage (hereinafter, referred to as FC voltage) and an output current (hereinafter referred to as FC current) of the fuel cell 40 are respectively detected by a voltage sensor 92 and a current sensor 93. While a fuel gas such as a hydrogen gas is supplied from a fuel gas supply source 70 to a fuel electrode (anode) of the fuel cell 40, an oxidant gas such as air is supplied from an oxidant gas supply source 80 to an oxygen electrode (cathode) thereof.

The fuel gas supply source 70 is constituted by a hydrogen tank, various valves, etc., and an amount of the fuel gas to be supplied to the fuel cell 40 is controlled by adjusting the degree of opening, ON/OFF time, etc.

The oxidant gas supply source 80 is constituted by an air compressor, a motor for driving the air compressor, an inverter, etc., and an amount of the oxidant gas to be supplied to the fuel cell 40 is adjusted by adjusting, e.g., the revolution speed of the motor.

The battery 20 is a chargeable and dischargeable secondary battery and constituted by a nickel-hydrogen battery, etc. Obviously, any chargeable and dischargeable capacitor (e.g., capacitor) other than the secondary battery may be provided instead of the battery 20. The battery 20 is inserted into a discharge path of the fuel cell 40 and is connected in parallel with the fuel cell 40. The battery 20 and the fuel cell 40 are connected in parallel with the inverter 60 for the traction motor, and the DC/DC converter 30 is provided between the battery 20 and the inverter 6.

The inverter 60 is a pulse width modulation-type (PWM) inverter constituted by, for example, a plurality of switching elements, and the inverter 60 transforms a direct-current power output from the fuel cell 40 or the battery 20 to a three-phase alternating-current power in accordance with a control command given from a control device 10, and supplies the three-phase AC power to the traction motor 61. The traction motor 61 is a motor for driving the wheels 63L and 63R, and the revolution speed of the motor is controlled by the inverter 60.

The DC/DC converter 30 is a full-bridge converter which includes, for example, four power transistors and a dedicated drive circuit (each not shown). The DC/DC converter 30 has: the function of increasing or decreasing the DC voltage input from the battery 20 and then outputting the DC voltage toward the fuel cell 40; and the function of increasing and decreasing the DC voltage input from the fuel cell 40, etc., and then outputting the DC voltage toward the battery 20. These functions of the DC/DC converter 30 charge and discharge the battery 20.

Provided between the battery 20 and the DC/DC converter 30 are auxiliary apparatuses 50 such as a vehicle auxiliary apparatus and an FC auxiliary apparatus. The battery 20 serves as a power supply of these auxiliary apparatuses 50. Note that the vehicle auxiliary apparatus refers to various types of electrical equipment used during the operation of the vehicle (e.g., lighting equipment, air conditioner and hydraulic pump), while the FC auxiliary apparatus refers to various types of electrical equipment used for the operation of the fuel cell 40 (e.g., pumps for supplying the fuel gas and oxidant gas).

Further, an insulation resistance measurement unit 90 is connected to wiring that leads to the fuel cell 40. The insulation resistance measurement unit 90 measures an insulation resistance between the fuel cell 40 and a vehicle body.

The operations of the above-described components are controlled by the control device (control unit) 10. The control device 10 is configured as a microcomputer provided therein with a CPU, ROM and RAM.

The control device 10 controls the units in the system such as a pressure regulating valve 71 provided in a fuel gas path, a pressure regulating valve 81 provided in an oxidant gas path, the fuel gas supply source 70, the oxidant gas supply source 80, the battery 20, the DC/DC converter 30 and the inverter 60 in accordance with input sensor signals.

The control device 10 receives inputs of various sensor signals on, e.g., a supply pressure of the fuel gas which is detected by a pressure sensor 91, an FC voltage of the fuel cell 40 which is detected by a voltage sensor 92, an FC current of the fuel cell 40 which is detected by a current sensor 93, an SOC (State Of Charge) value representing the SOC of the battery 20 which is detected by an SOC sensor 21.

In this embodiment, even when limitations are put on an amount of charge of the battery 20, for example, the switching frequency of the DC/DC converter 30 is raised, while the energy loss of the DC/DC converter is increased, thereby reliably avoiding the voltage of the fuel cell 40 becoming equal to or higher than a predetermined high-potential prevention voltage threshold below an open circuit voltage of the fuel cell 40.

Next, high-potential prevention control processing intermittently performed by the control device 10 will be described.

The control device 10 calculates electric power required from the fuel cell 40. The required electric power is electric power for driving, e.g., the traction motor 61 and the auxiliary apparatuses 50. The control device 10 then calculates an output voltage of the fuel cell 40 in accordance with the required electric power using a not-shown characteristic map showing I-V characteristics and I-P characteristics. This characteristic map is obtained in advance through, e.g., experiments, and is stored in internal memory 11 in the control device 10 at the time of, e.g., shipment after manufacturing. Note that values of the characteristic map may be fixed values, or may also be sequentially rewritable values.

The control device 10 then judges whether or not an output voltage of the fuel cell 40 needs to be forced to be decreased. More specifically, the control device 10 compares the output voltage with a high-potential prevention target threshold voltage (hereinafter, threshold voltage Vth), and determines that the output voltage of the fuel cell 40 needs to be forced to be decreased when the output voltage exceeds the threshold voltage Vth. On the other hand, when the output voltage is equal to or lower than the threshold voltage Vth, the control device 10 determines that the output voltage of the fuel cell 40 does not need to be forced to be decreased.

The threshold voltage Vth is a voltage lower than the open circuit voltage of the fuel cell 40, and is obtained in advance through, e.g., experiments, and stored in the internal memory 11 of the control device 10 at the time of shipment after manufacturing. The threshold voltage Vth may have a fixed value, and may also have a sequentially rewritable value in accordance with, e.g., a surrounding environment (outdoor air temperature, fuel cell temperature, humidity, operation mode, etc.).

When the control device 10 determines in the above judgment that the output voltage of the fuel cell 40 does not need to be forced to be decreased, the control device 10 ends the processing since a control that avoids a high-potential state of the fuel cell 40 is unnecessary.

On the other hand, when the control device 10 determines in the above judgment that the output voltage of the fuel cell 40 needs to be forced to be decreased, the control device 10 performs a control to force the output voltage of the fuel cell 40 to be decreased to a value below the threshold voltage Vth. At this point, to which value the output voltage of the fuel cell 40 is forced to be decreased may be set arbitrarily. The control device 10 then judges whether or not surplus power can be absorbed in the battery 20 (i.e., whether or not the surplus power can be absorbed in the battery 20). More specifically, the control device 10 judges whether or not the surplus power can be absorbed in the battery 20 by, for example, obtaining the SOC value detected by the SOC sensor 21 and checking an amount of remaining power in the battery 20.

When the control device 10 determines that the surplus power can be absorbed in the battery 20, the control device 10 has the surplus power absorbed in the battery 20 (has the surplus power stored in the battery 20), and then ends the processing. On the other hand, when the control device 10 determines that the surplus power cannot be absorbed in the battery 20, the control device 10 has the surplus power P absorbed by, for example setting the switching frequency of the DC/DC converter 30 high to increase energy loss of the DC/DC converter 30, and then ends the processing.

FIG. 2 is a timing chart illustrating the content of a high-potential prevention control in a normal power generation mode. After time td1 in FIG. 2, reaction gases are supplied to the fuel cell 40, and thus, a command voltage (a dashed line Xd1 in FIG. 2) is set to the threshold voltage Vth, whereby the voltage (a solid line Xd2 in FIG. 2) of the fuel cell 40 can be maintained substantially at the threshold voltage Vth.

Meanwhile, FIG. 3 is a timing chart illustrating the content of a high-potential prevention control in an output stop mode. After a time te1 in FIG. 3, the supply of reaction gases to the fuel cell 40 is in a stop state. Therefore, even if a command voltage (a dashed line Xe1 in FIG. 3) to the DC/DC converter 30 is maintained at the threshold voltage Vth, the voltage of the fuel cell 40 (a solid line Xe2 in FIG. 3) cannot be maintained at the threshold voltage Vth.

Therefore, as shown in FIG. 3, when the voltage of the fuel cell 40 decreases to a predetermined voltage maintenance oxidant-gas blowing voltage (lower-limit voltage threshold) Vb below the threshold voltage Vth (times te2 and te3), the control device 10 carries out a voltage maintenance oxidant-gas blowing operation for supplying an oxidant gas to the fuel cell 40, whereby the voltage of the fuel cell 40 is increased to return to the threshold voltage Vth.

In this voltage maintenance oxidant-gas blowing operation, an air compressor is driven at a minimum air flow rate, a circulation pump for a fuel gas is driven at a minimum revolution speed, and a coolant pump for circulating a coolant for cooling the fuel cell 40 is driven in accordance with power generated by the fuel cell 40.

The amount of power generated by the fuel cell 40 increases as the threshold voltage Vth is lower, leading to an increase of the amount of gas consumed in a unit time. Therefore, an execution interval t (e.g., the time te2 to the time te3 in FIG. 3) between voltage maintenance oxidant-gas blowing operations becomes shorter.

While the occurrence of a large voltage variation in the fuel cell 40 is not preferable for performing an insulation resistance detection with high accuracy by the insulation resistance measurement unit 90, the voltage varies by performing voltage maintenance oxidant-gas blowing. Therefore, in order to avoid the voltage variation resulting from the voltage maintenance oxidant-gas blowing during the insulation resistance detection, the number of times of execution of the voltage maintenance oxidant-gas blowing needs to be reduced; in other words, the execution interval t between voltage maintenance oxidant-gas blowing operations needs to be lengthened.

In order to lengthen the execution interval t, it is sufficient that the amount of consumption of oxidant gas in a unit time is reduced; in other words, the amount of generated power is reduced by increasing the voltage of the fuel cell 40. In this embodiment, where the insulation resistance detection by the insulation resistance measurement unit 90 can be performed, for example, in the case of an output stop mode in which a vehicle is in a stop state, the threshold voltage Vth is changed such that the interval t between voltage maintenance oxidant-gas blowing operations is longer than an insulation resistance detectable time T during an insulation resistance detection control.

More specifically, assuming that the threshold voltage Vth is a value V1 for the case of not performing an insulation resistance detection, which is shown in FIG. 4, an interval tv1 between a time tf1 and a time tf2 for the voltage maintenance oxidant-gas blowing operation becomes shorter than the insulation resistance detectable time T, causing a possibility that an insulation resistance detection with high accuracy cannot be performed. In such a case, the threshold voltage Vth is increased to a value V2 obtained by increasing the value V1 by a predetermined amount, as shown in FIG. 5.

Figure 5:
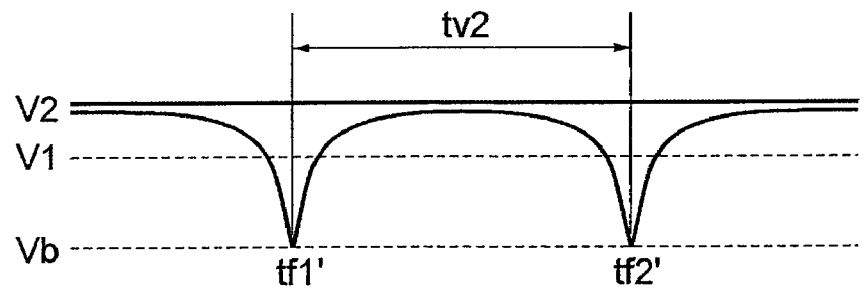
FIG. 5 is a time chart explaining the time when an insulation resistance detection is performed during a high-potential prevention control of the fuel cell system.

Accordingly, with the voltage maintenance oxidant-gas blowing operation indicated by a time tf1' in FIG. 5, the voltage increases to the higher threshold voltage Vth. As a result, an interval tv2 until a time tf2' when the voltage decreases to the voltage maintenance oxidant-gas blowing voltage, leading to the execution of the voltage maintenance oxidant-gas blowing operation, becomes longer than the interval tv1 between the times tf1 and tf2 for adjacent voltage maintenance oxidant-gas blowing operations in the case of not performing an insulation resistance detection.

Accordingly, the situation in which the interval t between voltage maintenance oxidant-gas blowing operations is longer than the insulation resistance detectable time T is created.

At this point, the interval t between voltage maintenance oxidant-gas blowing operations is shorter with a larger amount of cross leakage in the fuel cell 40. Therefore, the high-potential prevention voltage threshold may be changed in consideration of a variation, due to cross leakage, in the interval t between voltage maintenance oxidant-gas blowing operations. In other words, if the amount of cross leakage is large, a control to change a firm voltage so as to increase the threshold voltage Vth compared with the case of a small amount of cross leakage is additionally carried out.

Accordingly, even if the fuel cell 40 deteriorates, resulting in a reduction of the interval t between voltage maintenance oxidant-gas blowing operations, this situation can be corrected.

The interval t between voltage maintenance oxidant-gas blowing operations may be lengthened by not only increasing the threshold voltage Vth but also decreasing the voltage maintenance oxidant-gas blowing voltage Vb. This case can reduce the frequency of a voltage maintenance oxidant-gas blowing operation, which is good in terms of fuel efficiency, etc. However, when the voltage maintenance oxidant-gas blowing voltage Vb is decreased, a platinum catalyst contained in the fuel cell 40 may enter a reduction area, resulting in a reduction of the surface of the platinum catalyst.

It is beneficial that the decrease of the voltage maintenance oxidant-gas blowing voltage to the extent of the unintentional reduction area is prevented as much as possible. Also, in order to achieve a smooth return from an output stop mode to a normal operation mode, it is beneficial that the decrease of the voltage maintenance oxidant-gas blowing voltage Vg is prevented as much as possible. For these reasons, in this embodiment, the threshold voltage Vth is increased without decreasing the voltage maintenance oxidant-gas blowing voltage Vb.

As described above, when the high-potential prevention control is carried out in the output stop mode, since the supply of the reaction gases to the fuel cell 40 has been stopped, the voltage of the fuel cell 40 cannot be maintained at the threshold voltage Vth even if the command voltage to the DC/DC converter 30 is set to the threshold voltage Vth. Accordingly, when the voltage of the fuel cell 40 decreases to the predetermined voltage maintenance oxidant-gas blowing voltage Vb, the voltage maintenance oxidant-gas blowing operation for supplying the oxidant gas to the fuel cell 40 is performed.

During the voltage maintenance oxidant-gas blowing operation, when the insulation resistance measurement by the insulation resistance measurement unit 90 is performed, an error is caused in the measurement value. However, with the above configuration, the threshold voltage Vth is increased during the insulation resistance measurement by the insulation resistance measurement unit 90, whereby the interval t between voltage maintenance oxidant-gas blowing operations is lengthened (e.g., 50 seconds). Accordingly, the voltage maintenance oxidant-gas blowing operation can be prevented from being carried out during the insulation resistance measurement.

In accordance with the fuel cell system 100 according to the above-described embodiment, the control device 10 changes the threshold voltage Vth when the insulation resistance detection by the insulation resistance measurement unit 90 is performed during the high-potential prevention control that avoids the voltage of the fuel cell 40 becoming equal to or higher than the predetermined threshold voltage Vth. In other words, the threshold voltage Vth is changed such that the interval t between voltage maintenance oxidant-gas blowing operations during the high-potential prevention control is longer then the insulation resistance detectable time T during the insulation resistance detection control.

This enables an insulation resistance to be detected during the time between a voltage maintenance oxidant-gas blowing operation and the next voltage maintenance oxidant-gas blowing operation. Accordingly, the insulation resistance can be detected accurately even during the high-potential prevention control.

Also, the threshold voltage Vth is changed in consideration of the variation, due to cross leakage in the fuel cell 40, in the interval t between voltage maintenance oxidant-gas blowing operations, and accordingly, the insulation resistance can be detected more accurately.

What is claimed is:

1. A fuel cell system comprising:
    a fuel cell that generates electric power through an electrochemical reaction between a fuel gas and an oxidant gas;
    an insulation resistance measurement unit that measures an insulation resistance between the fuel cell and an outer conductor; and
    a control unit programmed to control a power generation state of the fuel cell, wherein
    the control unit is programmed to carry out a high-potential prevention control that avoids a voltage of the fuel cell becoming equal to or higher than a predetermined high-potential prevention voltage threshold lower than an open circuit voltage of the fuel cell, and to change the high-potential prevention voltage threshold during an insulation resistance detection performed by the insulation resistance measurement unit; and
    the control unit is programmed to perform a voltage maintenance oxidant-gas blowing operation in which an oxidant gas is supplied to the fuel cell when the voltage of the fuel cell decreases to a predetermined lower-limit voltage threshold lower than the high-potential prevention voltage threshold during the high-potential prevention control, and to change the high-potential prevention voltage threshold such that an interval between voltage maintenance oxidant-gas blowing operations is longer than an insulation resistance detectable time during the insulation resistance detection.

2. The fuel cell system according to claim 1, wherein the control unit is programmed to change the high-potential prevention voltage threshold in consideration of a variation, due to a cross-leakage in the fuel cell, in the interval between voltage maintenance oxidant-gas blowing operations.

3. The fuel cell system according to claim 1, wherein the control unit is programmed to increase the high-potential prevention voltage threshold such that the interval between voltage maintenance oxidant-gas blowing operations is longer than the insulation resistance detectable time during the insulation resistance detection.

* * * * *